W. L. WEBSTER.
TOOTHBRUSH.
APPLICATION FILED OCT. 26, 1921.
1,421,875. Patented July 4, 1922.
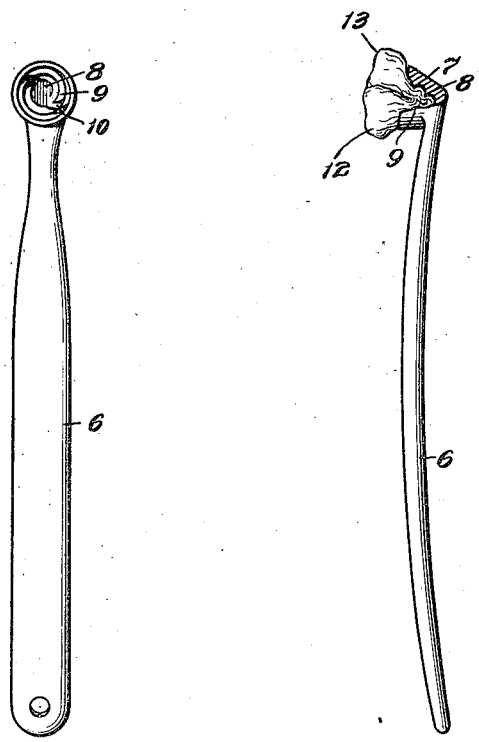
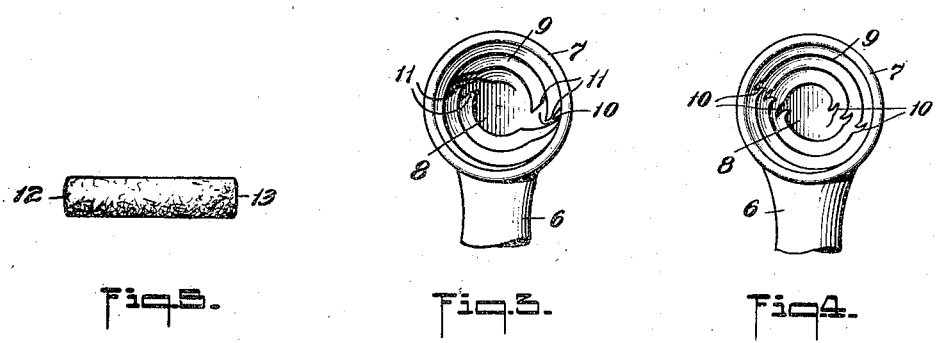
INVENTOR
William Lloyd Webster
BY
ATTORNEYS

UNITED STATES PATENT OFFICE.

WILLIAM LLOYD WEBSTER, OF NEW YORK, N. Y.

TOOTHBRUSH.

1,421,875. Specification of Letters Patent. Patented July 4, 1922.

Application filed October 26, 1921. Serial No. 510,577.

*To all whom it may concern:*

Be it known that I, WILLIAM LLOYD WEBSTER, a citizen of the United States, residing at New York city, county and State of New York, have invented a new and useful Improvement in Toothbrushes, of which the following is a specification.

The present invention relates to improvements in tooth-brushes such as those I have described in Patent No. 1,387,157 of May 17, 1921.

I have found doubled-over absorbent cotton roll to be an excellent material for use in cleaning and polishing the teeth, without injuring the gums. This material is cheap, is readily available, and is absolutely sterile. It may be economically discarded after use.

An object of my invention is to improve tooth-brushes by providing a suitable holder for the folded or doubled-over absorbent cotton roll so it can be used as a rubbing medium in cleaning the teeth. The present invention is more particularly directed to an improved holder which has means for preventing the accidental removal of the cotton roll from the holder.

The invention will be best understood by reference to the accompanying drawing, in which two embodiments of my invention are shown for the purpose of illustration. It is to be distinctly understood that the invention may take other forms than those illustrated.

In the drawing:

Fig. 1 is an elevation of the holder;

Fig. 2 is a side elevation partly in sections of the same;

Fig. 3 is an enlarged view of a portion of the holder;

Fig. 4 is a similar view of a modified form of holder and

Fig. 5 is a view showing an absorbent cotton roll.

A handle 6 of suitable configuration is provided at one end with an enlarged boss 7. The boss 7 is provided with a socket 8 which is preferably tapered in the direction shown. The walls of the socket are provided with screw threads 9 which are also tapered. The screw threads 9, however, are discontinuous; they are interrupted as shown at 10—10 to provide barbs 11.

Where the holder is made of hard rubber, bakelite, or similar material, I have found that it is preferable to cut the interruptions in the screw threads with a suitable tool in the manner shown in Fig. 3. The interruptions are continued to the root of the threads, and are so shaped as to provide the barbs 11. When the holder is made of metal, sharp barbs may be provided by inserting a tool resembling a reamer and turning it backwards, or cut in with a suitably formed chisel.

The preferable form of refilling material is the absorbent cotton roll 12—13, illustrated in Fig. 5. This roll can be doubled-over upon itself and then readily forced into the threaded socket 8 whereupon it assumes the position shown in Fig. 2. The socket is large enough at the mouth to readily receive the middle or doubled-over portion of the roll. When the roll is forced into the socket and twisted or screwed at the same time this portion of the roll passes down to the bottom of the socket, as illustrated in Fig. 2, and is securely held in place by the screw threads.

As these screw threads are preferably tapered the cotton roll is thus securely compressed into the bottom of the socket so that it cannot be easily pulled out. As the cotton roll is under considerable compression, a portion of it is forced in behind the barbs so that the roll is securely anchored. This prevents the accidental removal of the cotton roll from the socket. The user of course is able to readily remove the cotton roll by applying sufficient force to unscrew it.

What I claim is:

1. A holder for the rubbing material of a tooth-brush, having a socket provided with interrupted screw threads for retaining the rubbing material in the socket.

2. In a tooth-brush, a holder having an internally threaded tapered socket, the threads being interrupted and undercut to provide barbs whereby when a folded-over piece of absorbent cotton roll is screwed into the socket, the barbs grip the roll and prevent accidental unthreading.

3. In a tooth-brush, in combination, a handle, a tapered socket carried by the handle near one end, and means within the socket for the securement of a doubled-over piece of absorbent cotton roll therein, said means comprising interrupted screw threads adapted to directly engage the cotton roll whereby the free ends of the cotton roll may be presented in operative position, the interruption in the screw threads releasably holding the cotton roll in position.

WILLIAM LLOYD WEBSTER.